United States Patent [19]
Miller

[11] Patent Number: 4,561,555
[45] Date of Patent: Dec. 31, 1985

[54] PLASTIC CONTAINER HAVING ENLARGED FREE END PORTION FOR RECEIVING A METAL END UNIT BY DOUBLE SEAMING

[75] Inventor: Bryan H. Miller, Nashua, N.H.

[73] Assignee: Continental Plastic Beverage Bottles, Inc., Stamford, Conn.

[21] Appl. No.: 681,060

[22] Filed: Dec. 13, 1984

[51] Int. Cl.⁴ .............................................. B65D 41/12
[52] U.S. Cl. ....................................... 220/67; 220/74; 215/31; 215/327
[58] Field of Search .................... 220/67, 74; 215/327, 215/325, 324, 31

[56] References Cited

U.S. PATENT DOCUMENTS

| | | | |
|---|---|---|---|
| 3,081,906 | 3/1963 | Henchert | 220/74 X |
| 3,104,773 | 9/1963 | Podesta et al. | 215/327 |
| 3,367,533 | 2/1968 | Baker | 220/67 |
| 4,464,109 | 8/1984 | Giangiulio et al. | 220/67 X |

*Primary Examiner*—Donald F. Norton
*Attorney, Agent, or Firm*—Charles E. Brown

[57] ABSTRACT

This relates to a biaxially oriented molded polyester can which may be severed from an elongated blow molded container and which can has an open mouth defined by an edge portion which is enlarged so that the edge portion has generally the cross section of a match. This enlargement which may be formed during or after the severing of the can body from the elongated container is utilized in the formation of a seam between the can body and a metal end unit utilizing conventional double seaming equipment.

5 Claims, 10 Drawing Figures

PLASTIC CONTAINER HAVING ENLARGED FREE END PORTION FOR RECEIVING A METAL END UNIT BY DOUBLE SEAMING

This invention relates in general to new and useful improvements in plastic cans, and more particularly to a plastic can which is formed of a polyester resin and which is biaxially oriented to have all of the strength requirements of such a can.

Most particularly, this invention relates to a plastic can which is formed by the blow molding of a polyester preform into a biaxially elongated container and after which the container is severed at the desired height to define a can body having an integral bottom. In the severing of the can body from the remainder of the blow molded container, the free edge of such can body is heat deformed so as axially to shrink while transversely enlarging to have a cross section generally corresponding to that of the head of a wooden match.

The enlarged head formed at the free edge of the biaxially oriented polyester can body facilitates the double seaming of a metal end unit onto the can body to close the can body in an air and liquid tight relationship without requiring the usual flange on the can body.

Most particularly, in a dual rolling operation the seaming flange and end hook of the metal end unit are rolled toward each other and toward the exterior surface of the can body end portion in a first seaming operation, followed by a second seaming operation wherein the terminal flange of the end unit defined by the end hook is tightly compressed against both the seaming flange and the exterior surface of the can body with the terminal flange clinching the can body below the head of the can body to form the required liquid and air tight seal.

A feature of this invention is that by eliminating the requirement for a molded flange on the can body one can blow mold a container with an elongated body in a single height mold and may selectively sever the blow molded container at the desired height whereby, for example, the single blow mold may be utilized to form a can of one-half liter, three-quarter liter and one liter volume with the discarded portion of the container being reusable in the forming of further preforms.

With the above and other objects in view that will hereinafter appear, the nature of the invention will be more clearly understood by reference to the following detailed description, the appended claims, and the several views illustrated in the accompanying drawings.

IN THE DRAWINGS

It is known to form plastic can bodies and to close such can bodies utilizing metal end units. The metal end units may be secured in sealed relation to the open mouths of such plastic can bodies in several ways. Most particularly, the can body may be formed with an integral seaming flange and the end unit may be secured to the open end of the can body in a conventional double seaming process. On the other hand, it has been known to form plastic can bodies by injection molding wherein the mouth of the can body is defined by a free end portion which includes a radially outwardly molded enlargement which may be utilized in the securement of a metal end unit to such can bodies. First of all, the prior methods require a separate mold for each can size in accordance with the height of the desired plastic can. This is due to the fact that both the seaming flange on the can body and the can body enlargement must be formed by molding at the time the shape of the can body is otherwise formed.

By eliminating the seaming flange or the prior injection molded enlargement on the free edge of the can body, a single mold may be provided within which a polyester preform may be axially stretched and blow molded to provide an elongated biaxially oriented polyester container. Thereafter, that container may be cut off to the desired can body height.

Figure 1:
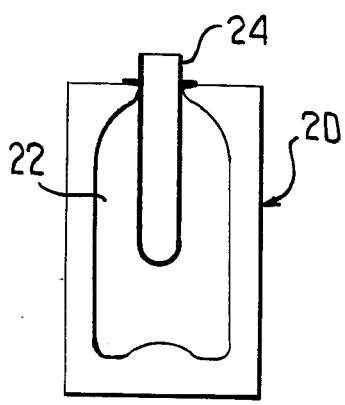
FIG. 1 is a schematic vertical sectional view taken through a conventional type of blow mold showing a preform positioned therein ready for blow molding into an elongated container.
Figure 2:
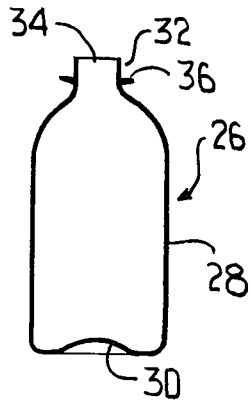
FIG. 2 is a schematic vertical sectional view taken through the resultant blow molded container.

Referring now to FIG. 1, it will be seen that there is schematically illustrated a conventional blow mold 20 of the split type having a cavity 22 in which an injection molded polyester preform 24 is first seated and then blow molded. In the blow molding of the preform 24, the preform is axially elongated as well as being stretched in the hoop direction. The net result is a tall container identified by the numeral 26 and illustrated in FIG. 2. The container 26 has an axially elongated body 28 which carries at the bottom thereof an integral bottom 30. The container 26 has a neck portion 32 which includes the original neck finish 34 of the preform 24 including a supporting flange 36.

There are several ways in which the body 28 may be severed at the desired height and heat treated so that there will be a combined axial shrinkage of the polyester at the free edge of the severed container and a transverse enlargement so that the free edge portion of the cut body 28 will have the general appearance of a match head.

Figure 3:
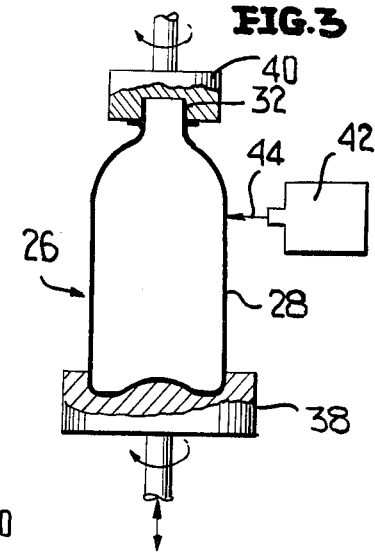
FIG. 3 is a schematic elevational view with parts in section showing the blow molded container of FIG. 2 being severed at a preselected height utilizing a laser.

In FIG. 3 there is illustrated the preferred embodiment of the invention wherein the container 26 is seated in a rotary support 38 and the neck finish 34 is engaged in a lower part of a head 40 which cooperates with the rotary support 38 axially to clamp the container 26 in position. If desired, the head 40 may be provided with a pressurized fluid connection (not shown) so that the container 26 may be internally pressurized.

In the embodiment of FIG. 3 there is provided a laser head 42 which directs a laser beam 44 at the preselected height of the container body 28 so as to cut off the container 26 to form a can body which is biaxially oriented and formed of a suitable polyester resin.

Figure 6:
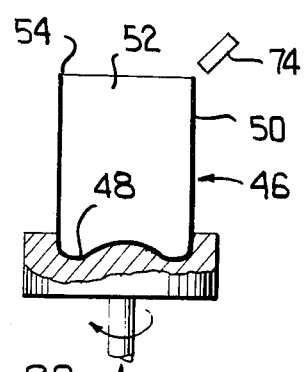
FIG. 6 is a schematic elevational view showing a free edge of the resultant can body being heated so as to deform the free edge in accordance with this invention.

As is generally best shown in FIG. 6, the severed lower part of the container 26 becomes a can body 46 having an integral bottom 48 and a constant cross section body 50 having an open mouth 52 defined by a free upper edge 54.

Because of the heat generated in the container body 28 during the severing thereof utilizing the laser beam 44, the free upper edge of the can body 50 is heated to a temperature wherein the polyester resin from which the can body 50 is formed shrinks axially while increasing in transverse height as at 56 so as to define a rounded transversely enlarged end portion 58 having the general appearance of the head of a match.

Figure 4:
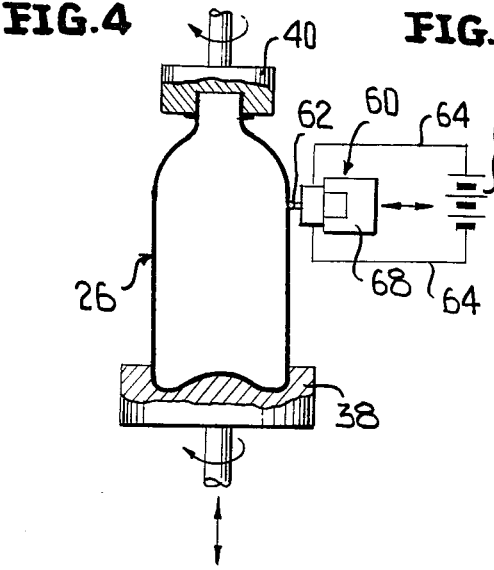
FIG. 4 is a schematic elevational view similar to FIG. 3, but showing the container being severed at a preselected height utilizing a hot wire.

In FIG. 4 there are illustrated the same support 38 and head 40 in which a like container 26 is mounted for rotation. There are, however, different cutoff means with the cutoff means being generally identified by the numeral 60 and being in the form of a heated wire 62 which is connected by way of leads 64 to a source of electrical energy 66. The heated wire 62 is carried by a holder 68 which may be transversely adjusted.

Figure 7:
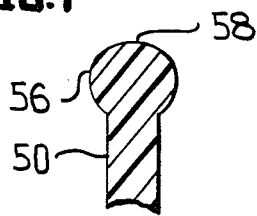
FIG. 7 is an enlarged fragmentary vertical sectional view taken through an upper part of a can body which has been severed from the blow molded container and heat treated in the manner illustrated in FIG. 3, FIG. 4, or a combination of FIGS. 5 and 6, and shows the enlarged head resultant construction.

It is to be understood that the heated wire will provide a heat input into the severed edge of the can body 50 so as to produce the axial shortening and transverse increase in height of the general type provided by the laser beam 44 so that the resultant free edge portion of the container body 50 severed in the manner illustrated in FIG. 4 will have approximately the same cross section as that shown in FIG. 7.

Figure 5:
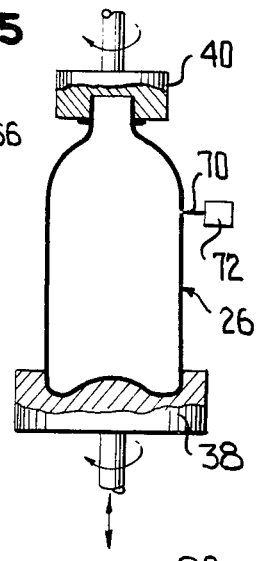
FIG. 5 is another schematic elevational view showing the container being severed at the preselected height utilizing a suitable cutter.

Reference is now made to FIG. 5 wherein a blow molded polyester container 26 is again mounted between the support 38 and the head 40, but wherein the container 26 is severed to form the can 46 utilizing a blade 70 which is carried by a suitable holder 72. At this time it is pointed out that it is also feasible for the blade to be rotated while the container 26 remains stationary.

The can body 50 with the severed upper edge is generally square cut and includes no enlargement. However, the cut free edge of the can body 46 may be heat treated utilizing a suitable heat source 74 to provide the same type of heating provided by both the laser beam 44 and the hot wire 62 with a resultant axial fore-shortening and transverse thickening to have substantially the same appearance as shown in FIG. 7. It is to be understood that the heat source may be a hot air blower or in the form of a heating element or a combination thereof.

The can body 50 having the axially fore-shortened and transversely thickened rounded free edge portion 58 is now of a shape to receive a generally conventional metal end unit 76 for securement to the can body 50 by a modified double seaming operation.

Figure 8:
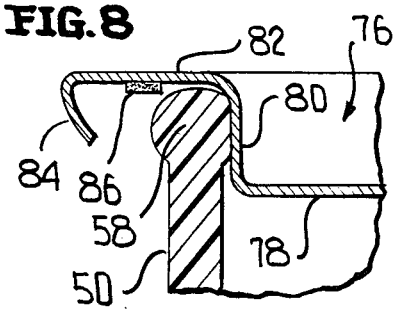
FIG. 8 is a fragmentary enlarged sectional view showing a conventional metal end unit as initially applied to the free open end of the can body.
Figure 10:
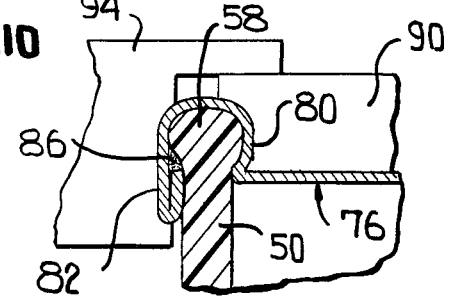
FIG. 10 is a schematic view similar to FIGS. 8 and 9, showing the end unit after the second and completed seaming operation.

Referring to FIG. 8, it will be seen that the metal end unit 76 includes an end panel 78 which is disposed generally within an upstanding chuck wall 80. The chuck wall 80 carries an annular seaming flange 82 which terminates in a terminal flange portion in the form of an end hook 84. A band of seaming compound 86 is applied to the underside of the seaming flange 82 in the customary manner.

At this time it is to be understood that the end panel 78 will be varied in accordance with the nature of the product which is to be packaged within the can 46 and may be of the easy opening type suitable for the dispensing of a liquid or wherein the entire end panel 78 is removed for the dispensing of solids and semi-solids.

Figure 9:
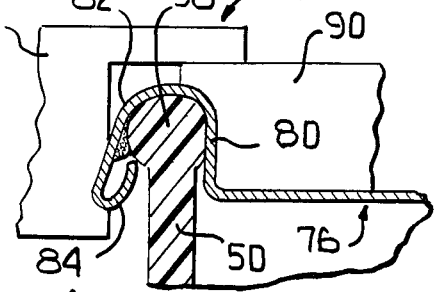
FIG. 9 is a fragmentary sectional view showing the end unit after a first seaming operation.

In a conventional double seamer generally identified by the numeral 88 the end unit 76 is subjected to a first seaming operation utilizing a conventional seaming chuck 90 and a first operation seaming roll 92 which may be slightly modified. With the chuck wall 80 backed up by the seaming chuck 90, the seaming roll 92 will function gradually to turn the seaming flange downwardly and toward the can body 50 while at the same time folding the end hook 84 toward the underside of the seaming flange 82. At the end of the first operation the folded seaming flange 82 and end hook 84 will have the appearnace shown in FIG. 9.

Thereafter, in the same double seamer 88 with the end unit 76 still supported by the seaming chuck 90, the seaming flange 82 is engaged by a second operation roll 94 which will gradually fold the seaming flange 82 toward the can body 50 with the end hook first engaging the exterior surface of the can body 50 below the enlarged head 58. As the seaming flange 82 is continued to be folded toward the can body 50, there will be a flattening of the end hook 84 against the seaming flange 82 as well as a slight deformation of the chuck wall 80 so as tightly to clinch the can body 50 below the enlarged head 58 and thus provide a good mechanical interlock between the end unit 76 and the can body 50. The sealing compound 86 will be deformed so as to fill the space between the seaming flange 82 and the enlarged head 58 to make certain that in addition to there being a mechnically acceptable interlock between the end unit 76 and the can body 50, there will be an air and liquid tight seal.

As pointed out above, only one mold size is required to form can bodies, normally cylindrical in cross section, of different heights with the unused upper portion of the container 26 being reusable without loss and thus the cost of molds for various height containers is greatly reduced.

It is to be understood that cans 46 may be provided in different diameters even though the cans are formed by blow molding of the polyester resin so that there may be provided cans of sizes comparable to those which are now available when the cans are formed of metal. Further, since conventional end units are utilized, no specific requirement for special end units exists. Finally, standard closing machines may be used to secure the end units to the can bodies, thereby permitting an entirely different class of containers utilizing, for all practical purposes, all old and conventional equipment.

Although only several preferred embodiments of the manner in which the can bodies may be severed from the blow molded container have been specifically illustrated and described herein, it is to be understood that minor variations in the resultant closed polyester can and the method of forming the same may be made without departing from the spirit and scope of the invention as defined by the appended claims.

I claim:

1. A can component comprising a body having an integral bottom wherein said body and bottom are formed of biaxially oriented polyester, and said body has an open top defined by a free upper edge portion showing evidence of heating and resultant shrinking to define in cross section a transversely enlarged rounded part.

2. A can component according to claim 1 wherein a metal end unit sealingly closes said can open top with said end unit clampingly engaging said body below said transversely enlarged rounded part.

3. A can component according to claim 2 wherein said end unit has a generally inverted U-shaped cross section outer portion including a chuck wall engaging an interior surface of said can body and a seaming flange opposing an exterior surface of said can body, and a bight portion joining said seaming flange to said chuck wall.

4. A can component according to claim 3 wherein said seaming flange carries an integral reversely turned terminal flange which tightly engages said body exterior surface below said transversely enlarged rounded part.

5. A can component according to claim 4 wherein said terminal flange is formed from an end hook.

* * * * *